United States Patent [19]

Rockstedt

[11] Patent Number: 5,499,870
[45] Date of Patent: Mar. 19, 1996

[54] MULTISCREW, CONTINUOUS MIXING MACHINE FOR PLASTICIZABLE COMPOUNDS

[75] Inventor: Siegward Rockstedt, Bad Neuenahr, Germany

[73] Assignee: Maschinenfabrik S. Rockstedt GmbH, Germany

[21] Appl. No.: 446,033

[22] Filed: Jun. 2, 1995

Related U.S. Application Data

[63] Continuation of Ser. No. 163,262, Dec. 8, 1993, abandoned.

[30] Foreign Application Priority Data

Nov. 12, 1993 [DE] Germany .................. 43 38 795.0

[51] Int. Cl.⁶ ..................................... B01F 7/08
[52] U.S. Cl. ............... 366/85; 366/88; 366/90; 366/300; 366/321; 425/204; 425/208
[58] Field of Search ........................ 366/85, 84, 83, 366/90, 89, 88, 96, 97, 297, 300, 301, 321, 322, 323; 425/204, 208

[56] References Cited

U.S. PATENT DOCUMENTS

| | | |
|---|---|---|
| Re. 23,948 | 2/1955 | Fuller . |
| 2,519,014 | 8/1950 | Bankey . |
| 2,615,199 | 10/1952 | Fuller . |
| 3,008,184 | 11/1961 | Fritsch . |
| 3,154,808 | 11/1964 | Ahlefeld, Jr. et al. . |
| 3,224,739 | 12/1965 | Schuur . |
| 3,421,182 | 1/1969 | Colombo . |
| 3,608,868 | 9/1971 | Koch . |
| 3,632,256 | 1/1972 | Kasting et al. . |
| 3,941,535 | 3/1976 | Street . |
| 4,007,922 | 2/1977 | Tamura . |
| 4,352,568 | 10/1982 | Löhr et al. . |
| 4,541,270 | 9/1985 | Hanslik . |
| 4,752,135 | 6/1988 | Loomans ................ 366/85 |
| 4,875,847 | 10/1989 | Wenger ................ 425/208 |
| 4,900,156 | 2/1990 | Bauer ................ 366/85 |
| 5,267,788 | 12/1993 | Rockstedt . |

FOREIGN PATENT DOCUMENTS

| | | |
|---|---|---|
| 0165093 | 12/1985 | European Pat. Off. . |
| 815103 | 9/1951 | Germany . |
| 1014735 | 8/1957 | Germany . |
| 1044041 | 11/1958 | Germany . |
| 2058642 | 5/1972 | Germany . |
| 4015814 | 4/1991 | Germany . |
| 52-856 | 6/1977 | Japan . |
| 55-6410 | 2/1980 | Japan . |
| 931590 | 7/1963 | United Kingdom . |

*Primary Examiner*—Robert W. Jenkins
*Attorney, Agent, or Firm*—Banner & Allegretti, Ltd.

[57] ABSTRACT

The invention relates to a multiscrew, continuous mixing machine for plasticizable compounds with two screws, which rotate in a housing and which penetrate the cylindrical part of the housing that envelops the screw concerned and exhibit feed and metering sections and inbetween at least one homogenizing section and a mixing section, whereby the feed and metering sections are formed by intermeshing conveying screws, which rotate in the same direction and are arranged in the mixing elements, which are opposite the homogenizing and mixing sections and whose edges travel past each other with little clearance while rotating, whereby to form a chamber extending above the mixing elements, the edges maintain a distance from the part of the housing enveloping said edges that is significantly greater than the clearance. The mixing elements comprise process screw elements, whose lengths are in essence identical and which exhibit such a pitch that within the chamber the one process screw element feeds forward and the other process screw element feeds backward.

6 Claims, 4 Drawing Sheets

MULTISCREW, CONTINUOUS MIXING MACHINE FOR PLASTICIZABLE COMPOUNDS

This is a continuation of application Ser. No. 08/163,262, filed on Dec. 8, 1993 now abandoned.

The invention relates to a multiscrew, continuous mixing machine for plasticizable compounds with two screws, which rotate in a housing and which penetrate the cylindrical part of the housing that envelops the screw concerned, and feed and metering sections and inbetween at least one homogenizing section and a mixing section, whereby the feed and metering sections are formed by intermeshing conveying screws, which rotate in the same direction and are arranged in the mixing elements, which are opposite the homogenizing and mixing sections and whose edges travel past each other with little clearance while rotating, whereby to form a chamber extending above the mixing elements, the edges maintain a distance from the part of the housing enveloping said edges that is significantly greater than the clearance.

Such a machine is known from the DE-OS 42 02 821. In this machine axially stretched polygons, whose edges, which do not intermesh while rotating, travel past each other with little clearance, are used as the mixing elements, thus resulting in a pronounced, desired kneading effect. This kneading effect results from the edges penetrating into the conveyed material and pushing said material to the side, whereby no especially high shear forces are absorbed by the material. To achieve the requisite kneading effect in any case, the polygons are designed suitably long.

The invention is based on the problem of increasing the mixing effect of the aforementioned machine, without producing especially high shear forces, in order to achieve an especially intensive dispersing effect.

This problem is solved by means of the invention in that the mixing elements comprise process screw elements, whose lengths are in essence identical and which exhibit such a pitch that within the chamber the one process screw element feeds forward and the other process screw element feeds backwards.

Since the one element feeds forward and the other feeds backward, the material in the chamber circulates due to the process screw elements, acting in the opposite directions, in the chamber, which is formed in essence by means of the region of the space between the wall of the housing and the edges of the process screw elements, so that of the forward fed material, material is being continuously back fed again. This procedure takes place continuously in the chamber, whereby the material in said chamber is subjected repeatedly to this cyclic course and consequently subjected to a corresponding intensive dispersion. The materials to be mixed together are distributed especially uniformly, whereby fillers and pigments are optionally decomposed and incorporated in an especially uniformly distributed state. Especially high shear forces cannot occur, since the material, which is in the chamber and is pushed back from the edges of the process screw elements, has an adequate amount of free space in the chamber and especially with respect to the respective other process screw element, so that it can escape with relative ease. The circulation of the material depends on more material being supplied by means of the preceding conveying screws (feed section), whereby the residence time in the chamber can be determined by means of the feeding of the machine. This residence time is adjusted expediently in such a manner that the material travels through several circulations.

It must also be pointed out that it is known from the U.S. Pat. No. 2,615,199 to interrupt a conveying screw of a processing machine, which is intended for plasticizable compounds and exhibits conveying screws that do not intermesh and are driven in the opposite direction, by means of a short screw element, which owing to the oppositely oriented pitch of its flights achieves at the spot concerned a restricting effect which cannot, however, have a very intensive effect, since the opposing conveying screw with its flights offers adequate free space, in order to feed the material forward. The arrangement of such a back feeding screw element is provided in both conveying screws, whereby the said screw elements are spaced so far apart from each other that in any case a longer section of the respective other conveying screw is opposite such a screw element. Apart from the fact that the known machine does not function with conveying screws that rotate in the same direction and they do not intermesh, the known machine also lacks the design of a chamber in the region of the opposing screw elements, since a longer section of the other conveying screw is always opposite a screw element of the one conveying screw. Consequently lacking the formation of a chamber hardly any circulation can be produced in the region of a screw element and, in addition, there is virtually no effect on the residence time in the region of a screw element, since at least one conveying screw acts continuously on the material to be processed.

Furthermore, reference must be made to the DE-AS 1 679 884, which also relates to a processing machining for plasticizable compounds. To produce a mixing effect, this machine has intermeshing kneading elements in the form of opposing disks, which are provided with two or three axially extending edges. The relatively narrow kneading disks produce in the material to be processed a strong shear effect and thus a significant amount of heat is generated on account of the intermeshing of the kneading disks. The machine has intermeshing conveying screws, which rotate in the same direction and which, following the kneading disks, do not intermesh for a relatively short distance and are designed with varying pitches, so that the conveying screws exert here a more or less strong conveying effect. At the same time a longitudinal mixing effect is supposed to be produced in the region concerned; yet no circulation of the material in the region concerned is apparently included, a feature that is a decisive factor for the invention.

Therefore, it must be regarded as surprising that with the measure of the arrangement of process screw elements, whose lengths are in essence identical and which exhibit oppositely oriented pitches, a genuine circulation for the material to be processed, can be obtained within a chamber, defined by the process screw elements, said circulation being responsible for an especially intensive dispersing effect.

To limit the speed in the circulation of the material in the region of the chamber especially at high speeds of the conveying screws, the process screw elements are designed expediently in such a manner that adjacent screw flights are connected together by depressions. Owing to these depressions, the material to be processed can escape from the conveying direction of the process screw element concerned, thus is not dragged along by the screw element and may or may not pass over to the respective other screw element, thus producing to some degree a short circuit in the circuit. Within the framework of these short circuits, an especially intensive dispersing effect can form.

To utilize the depressions in the sense of intensive dispersion, the process screw elements can be designed in such a manner that the edges of the process screw elements that define the screw flights exhibit expansions due to cylindrical flattening offs; and the depressions have such a tilting effect relative to the expansions that they represent, in addition to depressions, a rhombic surface. Owing to the rhombic formation, the transitions from the depressions to the expansions exhibit edges, which taper off like blades and which divide the material queuing there and push said material into the respective adjacent thread channels.

The result of the arrangement of the depressions is that, despite the oppositely oriented pitch of the process screw elements, it is possible to provide the edges of the one process screw element with such short projections that while rotating the projections dive into the opposite screw flights of the other process screw element and dive out above the depression in the other process screw element. Of course, to this end it is necessary that the screws, which form the two conveying screws and which rotate at the same speed in any case, are adjusted at such an angle of rotation that at every revolution a projection is accommodated for a short period of time by the opposite screw flight and susequently by a depression, so that the projection cannot strike against the opposite process screw element when the screws are rotating. The result of the drive, which is required for such mixing machines and exhibits identical speed, is that after a 360° revolution each projection has again the same effect of diving in and out of the respective opposite process screw element. Such projects can further increase the dispersing effect of the machine.

To keep the chambers, defined by the process screw elements, continuously filled, restricting elements are provided expediently directly behind the process screw elements. Especially suitable restricting elements are screws with interrupted back feed thread. Then the material of one thread channel and flow over into the other thread channel at the points of the interruptions of the thread.

It must also be pointed out that opposing process screw elements can be arranged multiple times in succession.

One embodiment of the invention is shown in the Figures.

Figure 1:
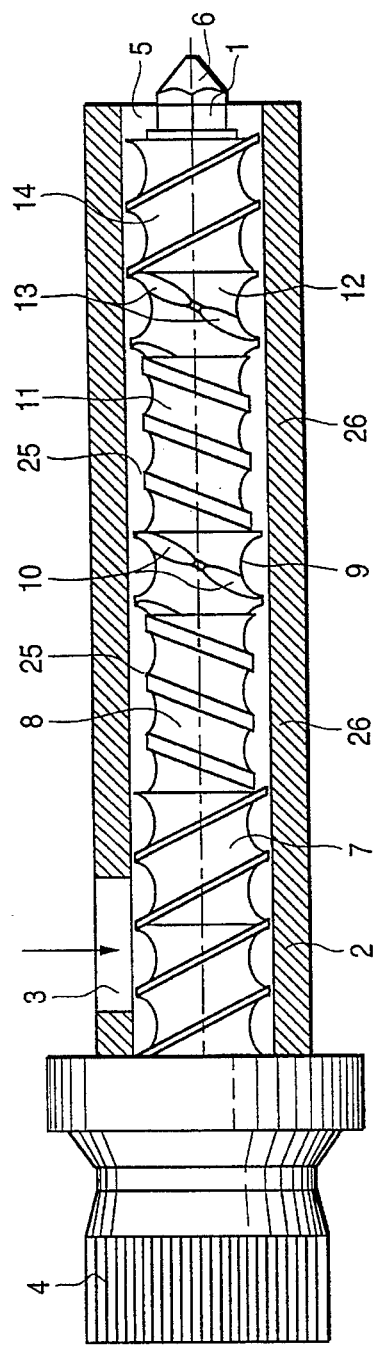
FIG. 1 is a side view of a mixing machine.

FIG. 1 depicts a twin screw mixing machine, and in particular in a side view, so that only one screw 1 is shown in the diagrammatically shown housing 2. The housing 2 has an inlet opening 3 for the feed of the material to be processed. The drive unit 4 is drawn on the left end of the housing 2. The right end of the housing 2 has the outlet 5, beyond which the screw tip 6 protrudes. Thus, it involves a conventional design of a twin screw mixing machine.

The screw 1 has in the region of the inlet opening 3 the conveying screw 7, followed by the process screw element 8. Following the process screw element 8 is a relatively short screw 9 as restricting element with screw thread oriented oppositely the conveying screw 7. Both illustrated thread channels of the screw 9 have two interruptions 10/10, in order to allow the necessary throughput in the region of the screw 9 despite its restricting effect. Following the screw 9 is another process screw element 11, followed by, as provided following the process screw element 8, the screw 12, which acts in the opposite direction as the restricting element and exhibits interruptions 13, so that both the process screw element 8 and the process screw element 11 function against the effect of the screws 9 and 11. The conveying screw 14, which conveys to the outlet 5 the processed material fed to said conveying screw, in the metering section, forms the end of the screw 1.

Figure 2:
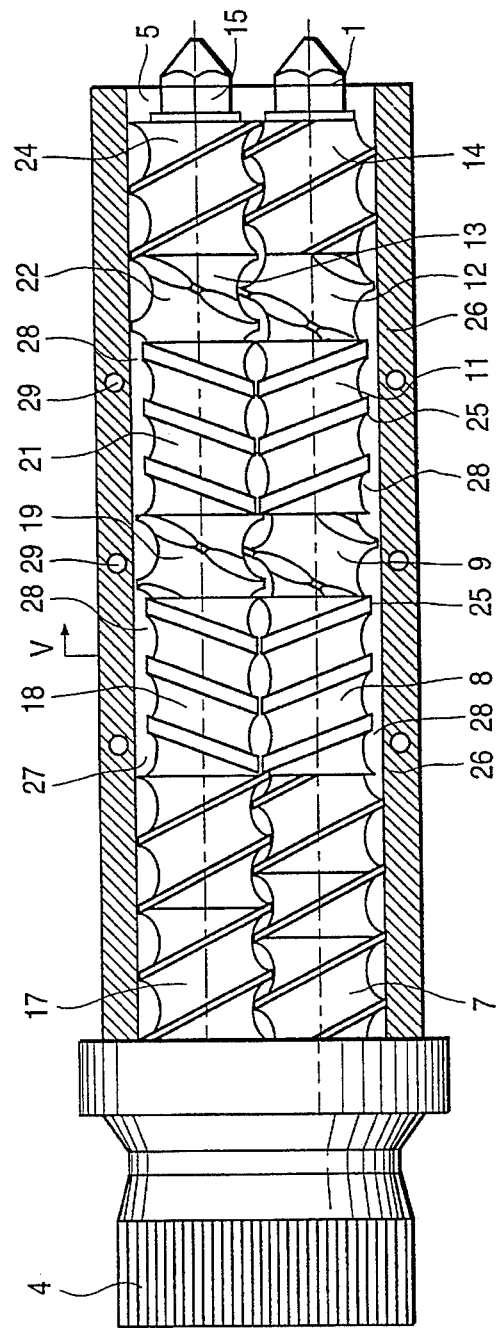
FIG. 2 is a top view of the same machine.

FIG. 2 is a top view of the twin screw mixing machine according to FIG. 1. In addition to the screw 1, there is the second screw 15, which is driven together with the screw 1 in the same direction by means of the drive unit 4. Both screws run at the same speed. The screw 15, assembled in the same manner as screw 1, is provided in the region of the inlet opening 3, which is not visible in FIG. 2, with the conveying screw 17 (feed section), which intermeshes with the thread channels of the conveying screw 7 and vice versa. Thus, it involves conveying screws 7 and 17, which are driven in the same direction and intermesh in a known manner and which, owing to their intrinsic function, transport from left to right the material supplied by way of the inlet opening 3. At the same time the material flows into the region of the process screw elements 8 and 18, then to the restricting elements 9 and 19, then to the process screw elements 11 and 21 and finally by way of the metering screws 14, 24 to the outlet 5.

The material transported in from the conveying screws 7 and 17 (feed section) is mixed in the region of the process screw elements 8 and 18 as well as 11 and 21, whereby the material is conveyed forward along the screw 1 and backwards along the screw 15. The back fed material then impinges on the material freshly supplied by the conveying screws 7 and 17, so that it is deflected on the process screw element 8 and is conveyed forward again by said process screw element. Thus, the result is a circuit that repeats itself the more often, the less material is fed by the conveying screws 7 and 17. Thus, the dwell time in the region of the process screw elements 8 and 18 is the result of the feed of material by way of the conveying screws 7 and 17 situated in the feed section.

The same procedure repeats itself in the region of the process screw elements 11 and 21, whereby the respective following restricting elements 9 and 19 and 12 and 22 provide that the regions enveloping the process screw elements 8 and 18 as well as 11 and 21 remain continuously filled with material.

Owing to the dimensions of the diameters of the process screw elements 8 and 18 and 11 and 21 as well, whose edges 25 travel past each other with little clearance while rotating, so that the result is a distance relative to the inner wall 26 that is signficantly greater than the clearance, a chamber 27 or 28 is formed in the region of the process screw elements 8 and 18 and 11 and 21 as well. Said chamber is defined by the conveying screws 7 and 17 and the restricting elements 9 and 19 or by the latter and the restricting elements 12 and 22. The aforementioned circulation of the material to be processed forms within these chambers 27 and 28.

To give the material to be processed the requisite temperature, the housing 2 can be heated. To this end, the heating channels 29 are provided to which a suitable heat transfer medium can be supplied in the known manner.

Figure 3:
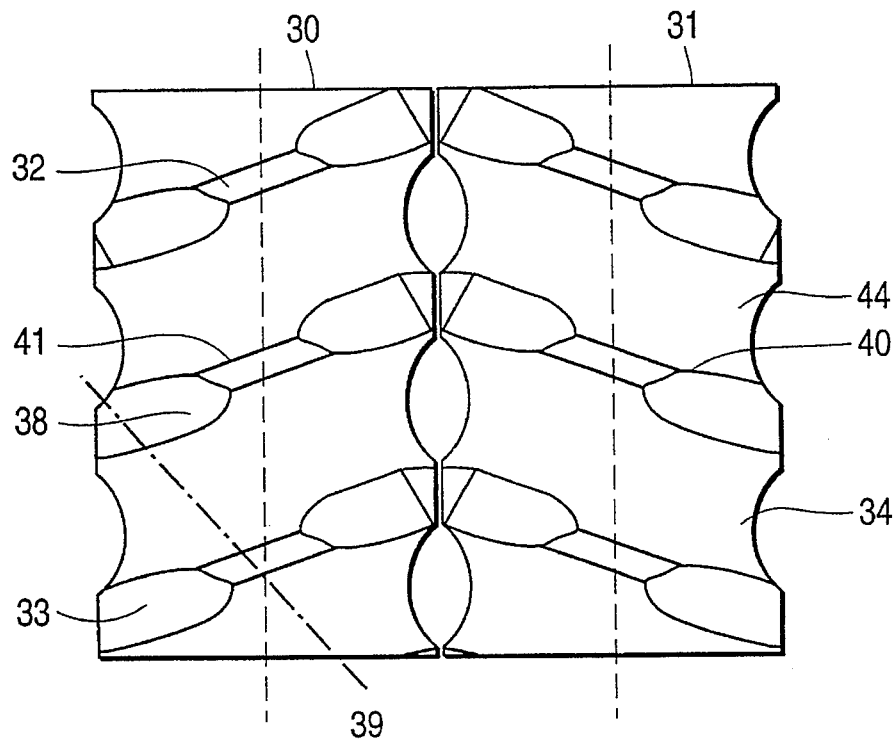
FIG. 3 depicts two opposing process screw elements with depressions connecting the screw flights.

FIG. 3 is a top view of two opposite process screw elements 30 and 31, which can replace the process screw elements 8 and 18 according to FIG. 2. The edges of the process screw elements 30 and 31 are interrupted by the depressions 33, whereby the depressions connect together the screw flights 34. Due to the depressions the material to be processed can flow over from one screw flight to the other, thus resulting in the material being continuously intensively mixed in the sense of good dispersion.

Figure 4:
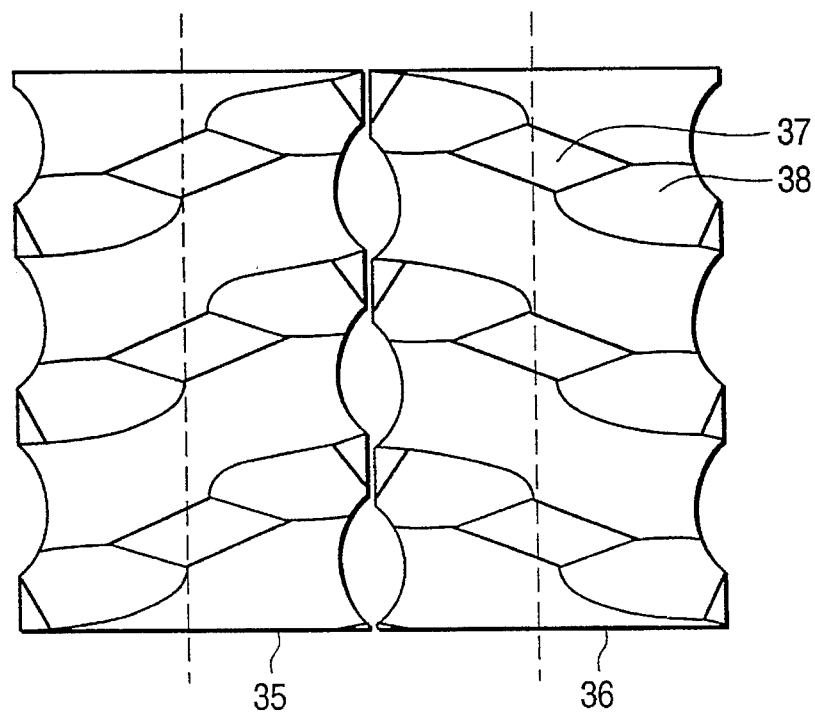
FIG. 4 depicts two adjacent process screw elements with expanded edges and depressions.

FIG. 4 shows another variation of the embodiment of the process screw elements. Here, the process screw elements 35 and 36 are provided along their edges by means of flattening-offs with expansions 37, which together form a cylindrical envelope. The expansions 37 are interrupted by depressions 38, which exhibit a tilted direction which is indicated by the dash-dotted line 39. Owing to this tilted direction the expansions 37, lying between the depressions 38, exhibit a rhombic surface. The ends of the rhombic surface form a kind of blade 40, which continues in an edge 41 along the depression 38 concerned. Material striking the blade 40 is distributed by means of this shape and pushed into the adjacent screw flights.

Figure 5:
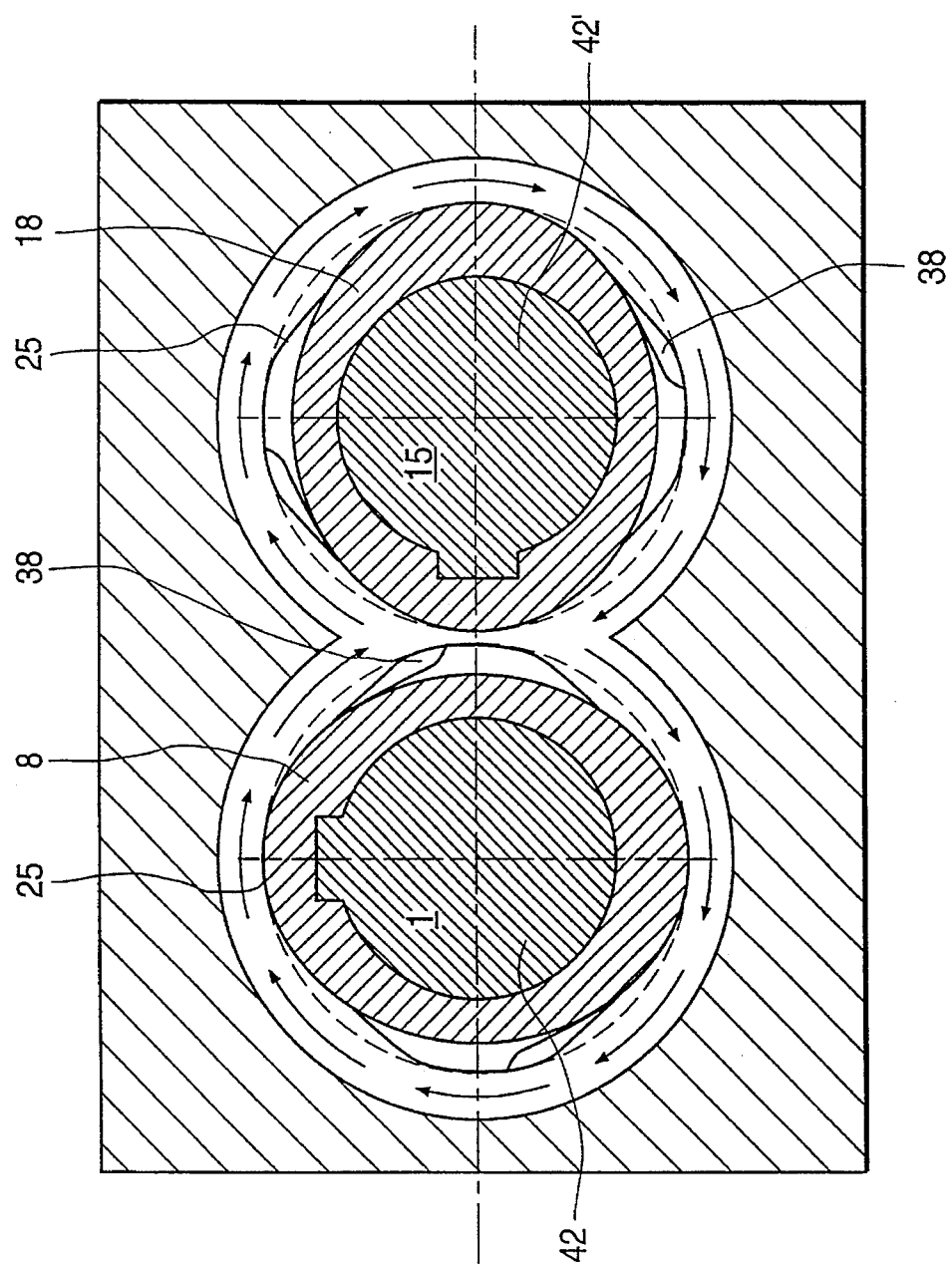
FIG. 5 is a cross sectional view of the machine along the line V—V of FIG. 2, based on the process screw elements according to FIG. 4.

FIG. 5 is a sectional view along line V—V of FIG. 2. FIG. 5 depicts the screw 1 with the basic screw 42 and the screw 15 with the basic screw 42. The two basic screws penetrate in a known manner the entire housing 2. The screws or screw elements concerned are slid on the basic screw. In the sectional view according to FIG. 5, they are the process screw elements 8 and 18. The two process screw elements 8 and 18 have one double thread each, of which the edges 25 and the depressions 38 are shown according to FIG. 4.

Figure 6:
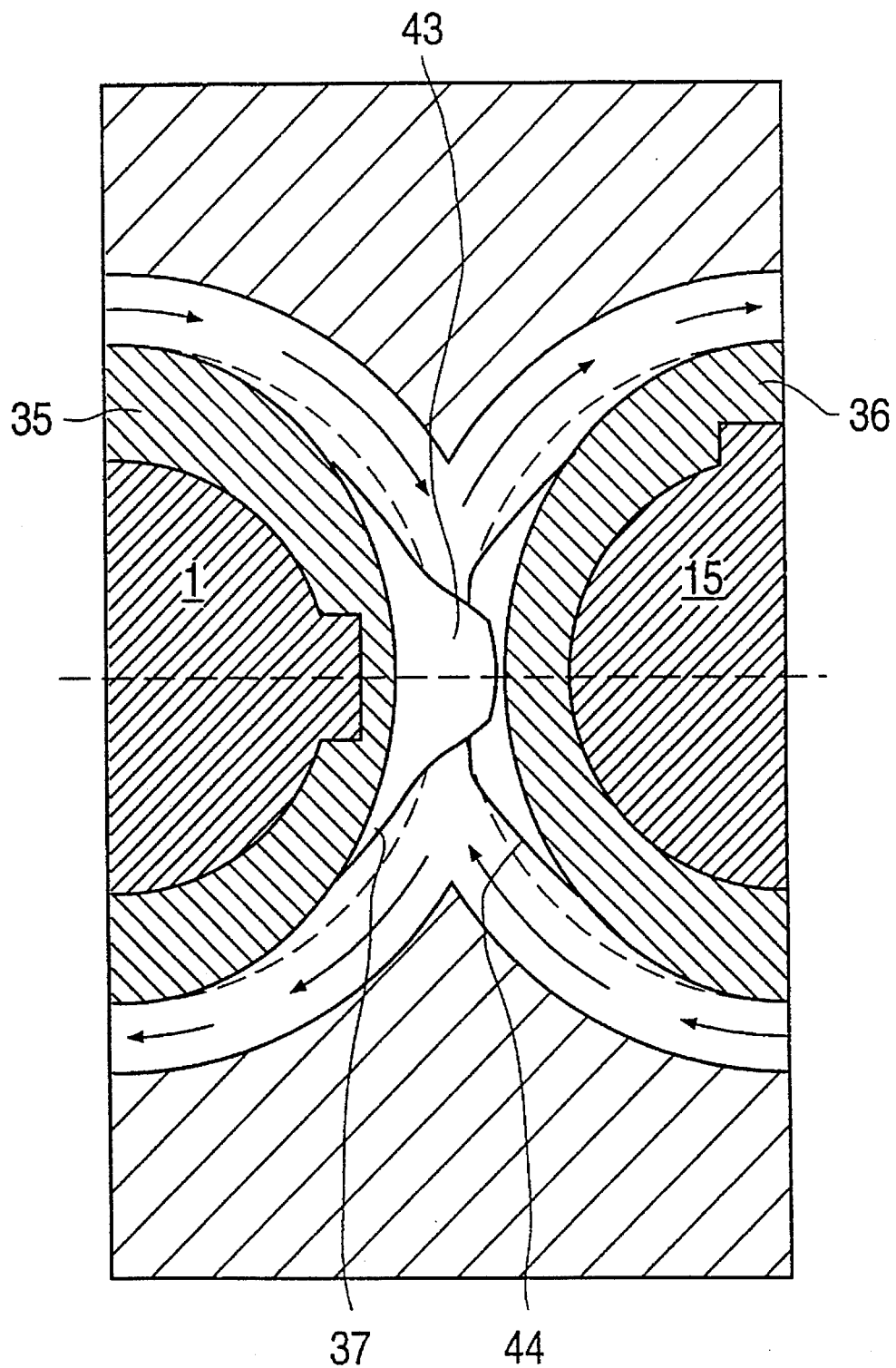
FIG. 6 is a cross sectional view of a detail of the machine along the line V—V, based on the opposing screw elements according to FIG. 4 and projections on a screw element.

FIG. 6 is a modification of the embodiment according to FIG. 5, and in particular to the effect that the rhombic surface of the expansion has the projection 43, which is so short that, when both screws 1 and 15 are rotated, said projection dives for a short period of time into the opposite screw flight 44 (see also FIG. 4) on the screw 15 and dives out above the depression 38 from the process screw element 36 concerned. Therefore, the projection 43 cannot strike against the surface of an element of the screw 15.

I claim:

1. A multiscrew, continuous mixing machine for plasticizable compounds which comprises a housing (2) having a cylindrical part and two shafts (1, 15) which rotate in the same direction and which penetrate the cylindrical part of the housing (2), wherein said housing and said shafts cooperatively form spaced apart feed and expelling sections and at least one melting and mixing section therebetween, wherein the feed and expelling sections are formed by intermeshing conveying screw segments (7, 17; 14, 24) on said shafts, and the melting and mixing section is formed by mixing segments on said shafts provided with opposed edges (25) which travel past each other with little clearance while rotating, wherein a chamber is formed to extend about the mixing segments such that the edges (25) are spaced a distance from the part of the housing (2) enveloping said edges that is significantly greater than the clearance between said edges, and wherein the mixing segments comprise process screw elements with opposite pitch whose lengths are generally identical such that within the chamber one process screw element feeds forward to a greater extent than the other process screw element feeds backward as plasticizable compounds are fed by said feed section thereby determining the resulting throughput in said chamber.

2. A machine as claimed in claim 1, wherein the process screw elements include depressions in said edges.

3. A machine as claimed in claim 2, wherein the edges of the process screw elements that define screw flights are flattened off to define expansive segments; and wherein the depressions are tilted relative to the expansive segments such that the expansive segments have a rhombic shape.

4. A machine as claimed in claim 3, wherein the edges of one process screw element are formed as short projections that while rotating dive into opposite screw flights of the other process screw element and dive out above depressions in the other process screw element.

5. A machine as claimed in any one of claims 1 to 4, wherein restricting elements are arranged directly behind the process screw elements.

6. A machine as claimed in claim 5, wherein the restricting elements comprise short screws with interrupted back feed threads.

* * * * *

UNITED STATES PATENT AND TRADEMARK OFFICE
CERTIFICATE OF CORRECTION

PATENT NO. : 5,499,870  
APPLICATION NO. : 08/446033  
DATED : March 19, 1996  
INVENTOR(S) : Siegward Rockstedt Page 1 of 1

It is certified that error appears in the above-identified patent and that said Letters Patent is hereby corrected as shown below:

On the title Page, The Assignee:
  Please delete "Maschinenfabrik S. Rockstedt GmbH" and insert --Berstorff GmbH--

Signed and Sealed this

Fifteenth Day of January, 2008

JON W. DUDAS  
*Director of the United States Patent and Trademark Office*